3,640,887
TRANSPARENT ZIRCONIA-, HAFNIA-, AND
THORIA-RARE EARTH CERAMICS
Richard C. Anderson, Schenectady, N.Y., assignor to
General Electric Company, Schenectady, N.Y.
No Drawing. Continuation of application Ser. No.
582,519, Sept. 28, 1966. This application Apr. 6,
1970, Ser. No. 26,075
Int. Cl. C09k 3/00; C04b 33/00
U.S. Cl. 252—301.1                                    11 Claims

ABSTRACT OF THE DISCLOSURE

The manufacture of transparent polycrystalline ceramic bodies composed of oxides of thorium, zirconium, and hafnium and mixtures thereof with oxides of the rare earth elements 58 through 71 of the Periodic Table and mixtures thereof with or without yttria, wherein the ceramic body is in the cubic crystal system, the average ionic radius of the rare earth oxide with or without the yttria is no greater than about 0.93 A., and the difference in ionic sizes of the oxides is no greater than about 0.22 A. is disclosed.

---

This application is a continuation of S.N. 582,519, filed Sept. 28, 1966 in the name of the same inventor and having a common sole assignee therewith and now abandoned.

This invention relates to ceramic bodies and more particularly to optically transparent high desity polycrystalline ceramic bodies and to a process for producing such bodies.

Ceramic materials are widely used in high temperature applications but with few exceptions are completely opaque and cannot be used where light transmission is required. There exist many situations in which a light transmitting ceramic would be of significant value. For example, as windows in furnaces, lenses in high temperature microscopes, lamp envelopes, laser applications and in applications such as a Faraday Rotator where a highly paramagnetic character is desired.

Previously, optically transparent oxides were achieved generally only in single crystal bodies, a time consuming, expensive and size-limited procedure. Special characteristics such as fluorescence, paramagnetism and the ability to be formed into large or intricate shapes were all but impossible to attain. Obviously the ability to obtain the special characteristics just mentioned and also to obtain optical transparency in polycrystalline ceramics would be of significant value.

However, many factors must be considered and overcome before any substantial degree of light transmission can be obtained. The presence of any precipitates in the ceramic causes light scattering and consequent low transmission of radiant energy. Similarly, pores trapped in the body during sintering to final density scatter light much like precipitates. Further, grain boundary cracks resulting from abnormal grain growth during firing act essentially as pores in their effect on transmissivity. All of these problems and others attending the obtaining of the special characteristics mentioned earlier, must be overcome to obtain high density transparent bodies.

It is a principal object of this invention to provide high density, transparent polycrystalline ceramic bodies of novel compositions possessing unique optical and/or magnetic properties.

Another object of this invention is to provide transparent ceramic bodies composed of oxides of the rare earth metals, numbers 58 through 71 of the Periodic Table of Elements, or one or more of these oxides with yttria, and containing thoria, zirconia or hafnia as a densifying agent.

An additional object of this invention is to provide a process for producing the bodies of this invention.

Further objects and advantages of this invention will be in part obvious and in part explained by reference to the accompanying specifications.

Generally, the transparent ceramics have a basis or parent composition which consists of the oxide of one or more of the rare earth metals (numbers 58 through 61) of the Periodic Table of Elements or some combination of the rare earth oxide with yttria. Also present in each instance is from about 2 to 15 mol percent of thoria, zirconia, hafnia, or some combination thereof to act as a densifying agent during sintering of the basis oxide(s) to final density. The basis oxides must be combined in amounts such that the resultant ceramic is crystallographically cubic and has an average ionic radius not in excess of about 0.93 A. In keeping with these requirements, when combinations of oxides are used to form the basis composition, the difference in ionic size between the rare earth metal cations should not exceed about 0.22 A.

The process of this invention broadly comprises preparing the proper mixture of ingredients to meet the limitations set forth above, pressing to green density and then sintering to final density and transparency. The atmosphere during sintering must be carefully regulated to preclude as much as possible any reduction of the oxide constituents. Should reduction occur, transparency cannot be achieved unless reoxidation of the fired body is done by subjecting it to oxygen at a temperature of 1200° C. or higher.

It was mentioned above that three criteria must be met to obtain transparent polycrystalline bodies in accordance with this invention. Again, these are: (1) the ceramic must be of cubic crystal form; (2) the average ionic radius of the basis composition must not exceed about 0.93 A.; and finally (3) where more than one oxide is used to produce the basis oxide, the difference in ionic radius size therebetween should not exceed about 0.22 A. When the average ionic radius exceeds about 0.93 A., the ceramic is no longer exclusively cubic but becomes partially monoclinic and transparency is replaced, at best, by translucency. When the differences in ionic radius exceeds about 0.22 A., similar difficulty arises because the ceramic is no longer exclusively cubic.

The materials which will form the basis oxides are the oxides of the rare earth metals, numbers 58 through 71, of the Periodic Table of Elements and yttrium oxide. The following Table I shows the ionic size of the cationic part of the rare earth oxides together with the ionic size of yttrium.

TABLE I

| Cation: | Ionic size A. |
|---|---|
| $Ce^{+3}$ | 1.073 |
| $Pr^{+3}$ | 1.055 |
| $Nd^{+3}$ | 1.036 |
| $Sm^{+3}$ | 1.000 |
| $Eu^{+3}$ | 0.982 |
| $Gd^{+3}$ | 0.964 |
| $Tb^{+3}$ | 0.945 |
| $Dy^{+3}$ | 0.927 |
| $Ho^{+3}$ | 0.909 |
| $Er^{+3}$ | 0.891 |
| $Tm^{+3}$ | 0.872 |
| $Yb^{+3}$ | 0.853 |
| $Lu^{+3}$ | 0.85 |
| $Y^{+3}$ | 0.909 |

A review of Table I shows that only those elements starting with dysprosium and ending with lutetium (numbers 66 through 71) and yttrium have an ionic radius which is by itself sufficient to meet one of the basic criteria enumerated earlier, viz, that the ionic size of the cation not exceed about 0.93 A. Those rare earth oxides having small enough ionic radii can be processed and sintered with the addition of one of the densifying agents thoria, hafnia, or zirconia directly to a transparent condition. However, those rare earth elements numbers 58 through 65, whose ionic radii exceed about 0.93 A. can be sintered to transparency only if combined with one or more of the rare earth oxides whose ionic radii are smaller than about 0.93 A. For example, while samarium exceeds the critical ionic radius size and cannot therefore be sintered to transparency by itself, it can be combined with an appropriate amount of ytterbium to produce a composition whose average ionic radius is not greater than critical.

An additional requirement to be met to insure the proper cubic crystallographic structure is that the differences between the ionic sizes of the constituent oxides not exceed about 0.22 A. For example, lutetium oxide with an ionic radius of 0.85 A. can be combined with those elements having ionic radii as large as that of praseodymium, which is 1.06. The maximum percentage of praseodymium which could be used would be on the order of about 34 mol percent, whereas for example, lutetium oxide could be combined with as much as 75 percent terbium oxide whose atomic radius is 0.945 A. Taking erbium oxide, for example, whose ionic radius is larger than that of lutetium, this material can be combined with cerium in amounts not exceeding about 19 mol percent, because the differences between the ionic radii do not exceed the approximate 0.22 A. limitation.

Thus far the discussion has centered on the oxides which make up the basis ceramic but in order to achieve transparency it is necessary that from 2 to 15 mol percent of a densifying oxide be included in the original composition. The oxides which are effective in accomplishing complete densification of the basis oxides are thoria, zirconia, and hafnia. These oxides may be added individually or can be combined, if desired. Generally, from 7 to 11 mol percent thoria, zirconia and hafnia represents the preferred compositional range. The following Table II lists compositions illustrative of those encompassed by the present invention which were produced in the form of transparent bodies. For present purposes, transparency is defined as the ability to read print through a sample of one millimeter thickness.

TABLE II

| Base oxide: | Densifying additive |
|---|---|
| 88 $Y_2O_3$—2 $Eu_2O_3$ | 10 $ThO_2$ |
| 88 $Y_2O_3$—3 $Eu_2O_3$ | 9 $ThO_2$ |
| 87 $Y_2O_3$—3 $Eu_2O_3$ | 10 $ThO_2$ |
| 90 $Y_2O_3$—4 $Eu_2O_3$ | 6 $ThO_2$ |
| 88 $Y_2O_3$—2 $Nd_2O_3$ | 10 $ThO_2$ |
| 88 $Y_2O_3$—3 $Nd_2O_3$ | 9 $ThO_2$ |
| 87 $Y_2O_3$—3 $Nd_2O_3$ | 10 $ThO_2$ |
| 90 $Y_2O_3$—4 $Nd_2O_3$ | 6 $ThO_2$ |
| 89 $Y_2O_3$—1 $Tb_2O_3$ | 10 $ThO_2$ |
| 90 $Y_2O_3$—1 $Ce_2O_3$ | 9 $ThO_2$ |
| 96 $Dy_2O_3$ | 4 $ZrO_2$ |
| 95 $Dy_2O_3$ | 5 $ZrO_2$ |
| 94 $Dy_2O_3$ | 6 $ZrO_2$ |
| 92 $Dy_2O_3$ | 8 $ZrO_2$ |
| 90 $Dy_2O_3$ | 10 $ZrO_2$ |
| 92 $Dy_2O_3$ | 8 $ThO_2$ |
| 90 $Dy_2O_3$ | 10 $ThO_2$ |
| 88 $Dy_2O_3$ | 12 $ThO_2$ |
| 98 $Ho_2O_3$ | 2 $ThO_2$ |
| 95 $Ho_2O_3$ | 5 $ThO_2$ |
| 92 $Ho_2O_3$ | 8 $ThO_2$ |
| 90 $Ho_2O_3$ | 10 $ThO_2$ |
| 89 $Ho_2O_3$ | 11 $ThO_2$ |
| 94 $Er_2O_3$ | 6 $ThO_2$ |
| 90 $Er_2O_3$ | 10 $ThO_2$ |
| 94 $Tm_2O_3$ | 6 $ThO_2$ |
| 90 $Tm_2O_3$ | 10 $ThO_2$ |

As previously mentioned, all of the preceding samples were transparent. In addition, it was found that many of the samples developed unique properties making them suitable for use in special applications. For example, samples containing $Eu_2O_3$ showed a very bright orange-red fluorescence at 610 millimicrons under ultraviolet light. The sample containing $Tb_2O_3$ showed fluorescence in the yellow-green region while those samples containing $Nd_2O_3$ were sky-blue and fluorescence in the infrared at approximately 1.06 microns. These fluorescing properties are significant in the development of high performance ceramic lasers, for example. The samples containing dysprosium oxide and holmium oxide are highly paramagnetic in character and of significance for use in such applications as a Faraday Rotator.

More than one oxide can be used to make the basis oxide, providing the ionic radius is maintained at less than about 0.93 A., as earlier indicated. The following Table III indicates compositions which were prepared and sintered to transparent bodies and also indicates the average ionic radius of the samples.

TABLE III

| Composition | Sintering Temperature, ° C. | Time, hours | Cationic radius average (excluding $Th^{+4}$) |
|---|---|---|---|
| 80 m/o $Y_2O_3$<br>10 m/o $Er_2O_3$<br>10 m/o $ThO_2$ | 2,200 | 1 | 0.907 |
| 80 m/o $Y_2O_3$<br>10 m/o $Dy_2O_3$<br>10 m/o $ThO_2$ | 2,200 | 1 | 0.911 |
| 80 m/o $Y_2O_3$<br>10 m/o $Pr_2O_3$<br>10 m/o $ThO_2$ | 2,100 | 2 | 0.925 |
| 70 m/o $Y_2O_3$<br>20 /mo $Gd_2O_3$<br>10 m/o $ThO_2$ | 2,150 | 1 | 0.921 |
| 45 m/o $Dy_2O_3$<br>45 m/o $Yb_2O_3$<br>10 m/o $ThO_2$ | 2,150 | 1 | 0.890 |
| 60 m/o $Dy_2O_3$<br>30 /mo $Tb_2O_3$<br>10 m/o $ThO_2$ | 2,050 | 1 | 0.933 |
| 80 m/o $Y_2O_3$<br>10 m/o $ThO_2$<br>1 m/o each of:<br>$Pr_2O_3$—$Nd_2O_3$—$Sm_2O_3$<br>$Eu_2O_3$—$Gd_2O_3$—$Tb_2O_3$<br>$Dy_2O_3$—$Ho_2O_3$—$Er_2O_3$<br>$Tm_2O_3$ | 2,150 | 1 | 0.915 |

The process by which the bodies of this invention are produced comprise preparing the necessary oxide ingredients so that the ionic radius and other factors discussed above fall within the proper limits. The material should be as pure as possible since the presence of any impurities could lead to defects in the final article of manufacture that would reduce its light transmitting characteristics. Once the ingredients are mixed, they are pressed to a green density at pressures generally ranging between 10,000 to 50,000 p.s.i., without the use of binders or lubricants. No unusual problems have been found in the compaction process although die pressing laminations have sometimes been evident in samples pressed at 20,000 p.s.i. or above. Pressures of 10,000 p.s.i. are adequate for preparing samples of full density. Green densities in excess of 60 percent of theoretical have been measured prior to the final firing or sintering operation.

The firing or sintering operation is the last step in the production of the transparent ceramic bodies. Generally, temperatures will range between 1900 and 2200° C., preferably 2000 to 2200° C., during densification of the green bodies. The optimum sintering temperature will vary somewhat depending upon the composition being processed. For example, $Dy_2O_3$ and $H_2O_3$ cannot be sintered over about 2050° C. because at higher temperatures volume changes associated with phase transformations causes cracking and other body disruption. More specifically, sintering is effected in a suitable furnace such as a molybdenum strip resistance heating furnace in a hydrogen atmosphere. The samples are raised to the sintering temperature at rates ranging between 20 and 200° C. and at the end of the sintering process are cooled at a similar rate. Complete density is usually obtained by soaking at 2050° C. for one hour although various times at temperatures between 2000 and 2200° C. have been successful.

When the sintering operation is carried out in dry hydrogen, the ceramic is reduced and this condition is maintained on cooling unless steps are taken to assure that a partial pressure of oxygen is present in the furnace while the bodies are still at some temperature in excess of 1200° C. By exposing the heated material to the oxygen, reoxidation of any reduced metal oxide can be effected and transparency obtained. Sintering in vacuum also can result in at least partial reduction of the constituent oxides but the solution here is the same, specifically, by reoxidation of the reduced oxides. Sintering in an oxygen atmosphere obviously precludes problems encountered by way of compound reduction.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A transparent polycrystalline ceramic body compositionally consisting of: (a) from about 2 to 15 mol percent of an oxide from the group consisting of $ThO_2$, $ZrO_2$, $HfO_2$ and combinations thereof: and (b) balance an oxide selected from the group consisting of (1), the oxides of the rare earth elements 58 through 71 of the Periodic Table of Elements (2), combinations of the rare earth oxides of (b) (1) with each other, and (3) combinations of at least one rare earth oxide of (b) (1) with $Y_2O_3$; the balance oxides of (b) being combined in amounts such that (1) the ceramic body is of cubic crystallographic form, (2) the average ionic radius of the balance oxide of (b) is no greater than about 0.93 A., and (3) when more than one oxide addition is present the difference in ionic sizes between them is no greater than about 0.22 A.

2. A transparent body as defined in claim 1 wherein from about 8 to 10 mol percent $ThO_2$ is present.

3. A transparent body as defined in claim 1 wherein from about 8 to 12 mol percent $ZrO_2$ is present.

4. A transparent body as defined in claim 1 wherein the ceramic compositionally consists of 8 to 10 mol percent $ThO_2$, balance substantially all an oxide from (b) (1).

5. A transparent body as defined in claim 1 wherein the ceramic compositionally consists of 8 to 10 mol percent $ThO_2$, balance substantially all an oxide from (b) (2).

6. A transparent body as defined in claim 1 wherein the ceramic compositionally consists of 8 to 10 mol percent $ThO_2$, balance substantially all an oxide from (b) (3).

7. A transparent body as defined in claim 1 wherein the ceramic compositionally consists of 4 to 11 mol percent $ZrO_2$, balance substantially all an oxide from (b) (1).

8. A transparent body as defined in claim 1 wherein the ceramic compositionally consists of 4 to 11 mol percent $ZrO_2$, balance substantially all an oxide from (b) (2).

9. A transparent body as defined in claim 1 wherein the ceramic compositionally consists of 4 to 11 mol percent $ZrO_2$, balance substantially all an oxide from (b) (3).

10. The transparent body as defined in claim 1 wherein the rare earth oxide is $Nd_2O_3$ and said body is an active laser medium.

11. The active laser medium body as defined in claim 10 wherein said body fluoresces under electromagnetic radiation.

References Cited
UNITED STATES PATENTS

| | | | |
|---|---|---|---|
| 3,549,554 | 12/1970 | Hirayama, et al. | 106—52 X |
| 3,522,190 | 7/1970 | Turner et al. | 252—301.4 R |
| 3,535,266 | 10/1970 | Lee | 252—301.4 R |
| 3,294,701 | 12/1966 | Vogel et al. | 252—301.4 R |
| 3,420,780 | 1/1969 | Forratt et al. | 252—301.1 |
| 3,289,100 | 11/1966 | Ballman et al. | 331—94.5 |
| 3,417,344 | 12/1968 | Grantham | 331—94.5 |

TOBIAS E. LEVOW, Primary Examiner

W. R. SATTERFIELD, Assistant Examiner

U.S. Cl. X.R.

106—39 R, 42, 57; 252—301.4 F